United States Patent
Schwartzman et al.

(10) Patent No.: US 7,529,303 B1
(45) Date of Patent: May 5, 2009

(54) METHODS AND APPARATUS FOR DETERMINING TRANSMISSION POWER LEVELS

(75) Inventors: Alejandro Schwartzman, San Jose, CA (US); Paul Lafferty, Hayward, CA (US); Weiliang Zhu, San Jose, CA (US); Timothy Finan, Milford, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/733,672

(22) Filed: Apr. 10, 2007

Related U.S. Application Data

(63) Continuation of application No. 10/016,032, filed on Dec. 12, 2001, now Pat. No. 7,221,712.

(51) Int. Cl.
  *H04B 3/00* (2006.01)
  *H04N 7/173* (2006.01)
(52) U.S. Cl. .................. 375/257; 375/222; 725/111
(58) Field of Classification Search .......... 375/257, 375/222; 725/111
  See application file for complete search history.

(56) References Cited

U.S. PATENT DOCUMENTS

2004/0087288 A1* 5/2004 Lapid ..................... 455/136

OTHER PUBLICATIONS

"Cable Modem Diagnostics and Signal Levis" www.homepage.ntlworld.com/robin.d.h.walker/cmtips/signal.html downloaded May 20, 2005 17 pages.

Wonglumstom et al, "Experimental Demonstration of an Access Point for HORNET—A Packet Over WDM Multiple Access MAN", Journal of Lightwave Technology, vol. 18, No. 12, Dec. 2000, pp. 1709-1717.

* cited by examiner

*Primary Examiner*—Kevin Y Kim
(74) *Attorney, Agent, or Firm*—Weaver Austin Villeneuve & Sampson LLP

(57) ABSTRACT

Methods and apparatus are provided for determining transmission power levels. The power characteristics of a cable modem family are determined by testing cable modems in a cable modem family with various downstream frequencies and transmission power levels to determine internal gain levels. The power characteristics of the cable modem family can then be stored in an efficient manner in each cable modem by using interpolation. The individual cable modem can then be characterized by testing the cable modem with a limited set of downstream frequencies and transmission power levels to determine an internal gain level offset for that particular cable modem. With the power characteristics table, internal gain level offset, and interpolation, transmission power levels can be determined during network operation when downstream frequencies and internal gain levels are known.

20 Claims, 9 Drawing Sheets

Relation between AGC 415 and trans. power level 411 when freq. 413 @ 315 MHz

Relation between AGC 415 and freq. 413 when trans. power level is at 0 dB

Figure 6

|       | 601 | 603 | 605 |
|-------|----------|----------|----------|
|       | 100 MHz  | 150 MHz  | 200 Mhz  |
| 611 / 10dB | 20000 | 25000 | 30000 |
| 613 / 5dB  | 40000 | 50000 | 60000 |
| 615 / 0dB  | 60000 | 75000 | 90000 |

METHODS AND APPARATUS FOR DETERMINING TRANSMISSION POWER LEVELS

CROSS REFERENCE TO RELATED APPLICATIONS

The present invention claims priority to U.S. patent application Ser. No. 10/016,032, filed Dec. 12, 2001, which is incorporated herein by reference in its entirety.

BACKGROUND OF THE INVENTION

1. Field of Invention

The present invention relates generally to determining transmission power levels. More particularly, the present invention relates to estimating transmission power levels in networks such as hybrid fibre coaxial (HFC) networks for communications between a cable network head end and a cable modem.

2. Description of the Related Art

Determining the power characteristics of a cable modem can allow more efficient transmission between a cable modem and a cable network head end. A cable modem typically receives transmissions at a variety of different downstream frequencies and transmission power levels. The different downstream frequencies and transmission power levels correspond to internal gain levels particular to that cable modem. An accurate characterization of the relationships between downstream frequencies, transmission power levels, and internal gain levels can be an important part of providing efficient and effective cable network operation.

In typical implementations, the power characteristics of a cable modem are determined by placing the cable modem under exhaustive test procedures. That is, each individual cable modem is tested with a wide variety of downstream frequencies and transmission power levels to determine internal gain levels. Many conventional test procedures test and calibrate cable modems using hundreds or thousands of different combinations of downstream frequencies and transmission power levels. These test procedures used during manufacturing and calibration of each individual cable modem take an extensive amount of time and resources. Accordingly, it is beneficial to provide improved techniques for allowing more efficient determination of power characteristics of a cable modem.

SUMMARY OF THE INVENTION

Methods and apparatus are provided for determining transmission power levels. The power characteristics of a cable modem family are determined by testing cable modems in a cable modem family with various downstream frequencies and transmission power levels to determine internal gain levels. The power characteristics of the cable modem family can then be stored in an efficient manner in each cable modem by using interpolation. The individual cable modem can then be characterized by testing the cable modem with a limited set of downstream frequencies and transmission power levels to determine an internal gain level offset for that particular cable modem. With the power characteristics table, internal gain level offset, and interpolation, transmission power levels can be determined during network operation when downstream frequencies and internal gain levels are known.

According to one embodiment, a method for determining power characteristics of a family of cable modems is provided. First internal gain levels associated with a first cable modem in a family of cable modems are determined across a plurality of frequencies and a plurality of transmission power levels. Second internal gain levels associated with a second cable modem in the first family of cable modems are determined across the plurality of frequencies and the plurality of downstream transmission power levels. The integrated internal gain levels are stored in the first cable modem. The integrated internal gain levels are derived using first and second internal gain levels. The integrated internal gain levels represent a first subset of the first and second internal gain levels.

According to another embodiment, a method for calibrating a cable modem associated with a cable modem family is provided. A first measured internal gain level associated with a cable modem communicating with an external node at a first downstream frequency and a first transmission power level is determined. A second measured internal gain level associated with the cable modem communicating with the external node at a second downstream frequency and a second transmission power level is determined. The cable modem is calibrated by comparing the first and second measured internal gain levels with stored internal gain level information associated with the cable modem family to determine a gain level offset.

According to another embodiment, a method for providing a transmission power level to an external node coupled to a cable modem is provided. A measured internal gain level associated with communications between a cable modem tuner and the cable modem demodulator is determined. A predetermined gain level offset is used to determine an adjusted internal gain level. The downstream frequency associated with communications between the cable modem and the external node is identified. Interpolation is used to find a transmission power level associated with the downstream frequency and the adjusted internal gain level.

Other embodiments of the invention pertain to computer program products including machine readable mediums on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 6 is a table representation showing linear interpolation.

DETAILED DESCRIPTION OF SPECIFIC EMBODIMENTS

Cable modems in the cable network typically receive transmissions from a cable network head end at particular downstream frequencies and transmission power levels. To allow reliable transmissions between the cable network head end and the cable modem, a cable modem can provide transmission power level information to the cable network head end. However, typical cable modems do not have a transmission power level detector. Cable modems, however, do have internal gain level measurements that roughly correspond to transmission power levels at particular frequencies. The internal gain levels vary as a function of transmission power levels and downstream frequencies. If the internal gain levels and the downstream frequencies are known, transmission power levels can be determined and provided to a cable network head end.

To allow a cable modem to make a determination of transmission power level based on downstream frequency and internal gain levels, power characteristics of cable modems are typically determined beforehand in an exhaustive manner. In many conventional implementations, each individual cable modem is placed as a unit under test and provided extensive combinations of transmission power levels and frequency inputs to determine internal gain levels. The exhaustively determined values can then be stored in the cable modem and provided to a cable network head end. However, exhaustively determining power characteristics of a cable modem often entails testing a cable modem under hundreds of thousands of different combinations of transmission power levels and downstream frequencies. The extensive determination of power characteristics can take a large amount of time and resources during manufacturing and calibration of each cable modem.

The techniques of the present invention recognize that cable modems in a cable modem family often have similar power characteristics. Techniques are provided for determining the power characteristics of a cable modem family and storing the power characteristics of the cable modem family in each individual cable modem in an efficient manner using interpolation. Variations between cable modems in a cable modem family can be compensated for by determining an internal gain level offset by measuring a smaller number of combinations of downstream frequency, internal gain levels, and transmission power levels. According to various embodiments, fewer than six combinations can be tested in order to accurately characterize a cable modem. Upon characterizing the cable modem, transmission power levels can be provided when downstream frequencies, internal gain levels, and internal gain level offsets are known.

Figure 1:
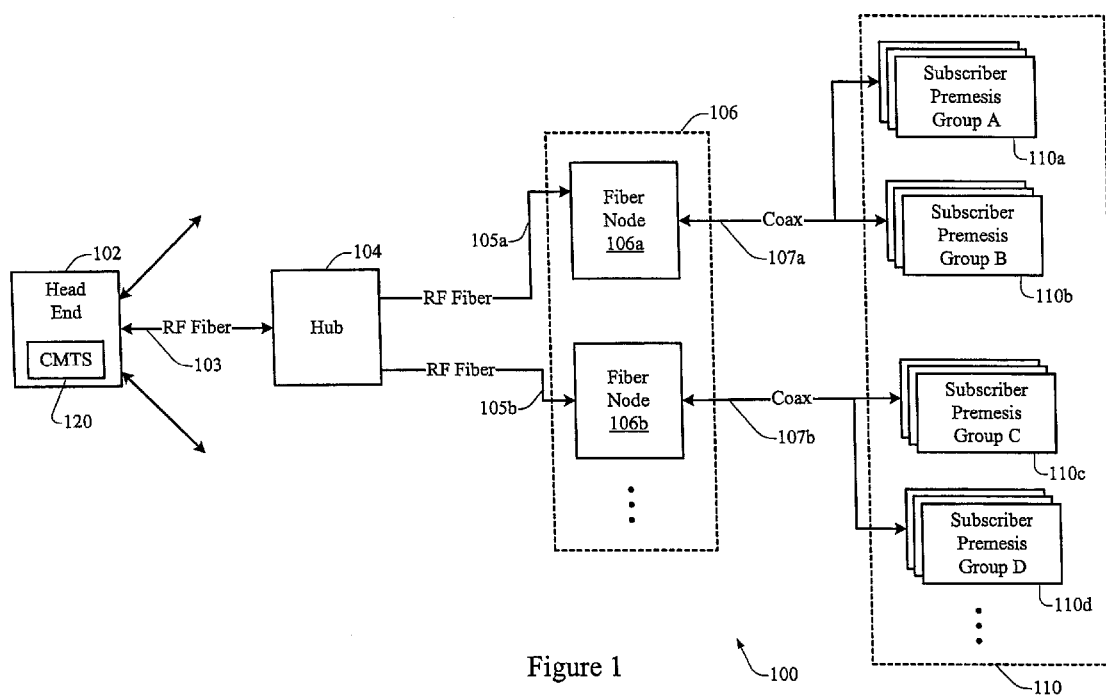
FIG. 1 is a diagrammatic representation of a network that can use the techniques of the present invention.

FIG. 1 is a diagrammatic representation of one example of a system that can use the techniques of the present invention. A cable network 100 includes a cable network head end 102 that provides a communication interface between cable modems in the cable network and other network nodes. A cable network head end 102 is typically maintained by a Multiple Service Operator (MSO). The cable modems typically reside at the subscriber premises 10a-d.

Each cable network head end 102 can be connected to one or more hubs 104. Each hub is configured to service one or more fibre nodes 106 in the cable network. Each fibre node is, in turn, configured to service one or more subscriber groups 110. A primary function of the fibre nodes 106 is to provide an optical-electronic signal interface between the cable network head end 102 and the plurality of cable modems residing at the plurality of subscriber groups 110.

Communication between the cable network head end 102, hub 104, and fibre node 106a is typically implemented using modulated optical signals that travel over fibre optic cables. More specifically, during the transmission of modulated optical signals, multiple optical frequencies are modulated with data and transmitted over optical fiber node such as, for example, optical fibre links 103 and 105a and 105b are typically referred to as "RF fiber nodes".

The modulated optical signals transmitted from the cable network head end 102 eventually terminate at the fibre node 106a. The fibre nodes maintain the RF modulation during conversion between fibre and coax media.

Figure 2:
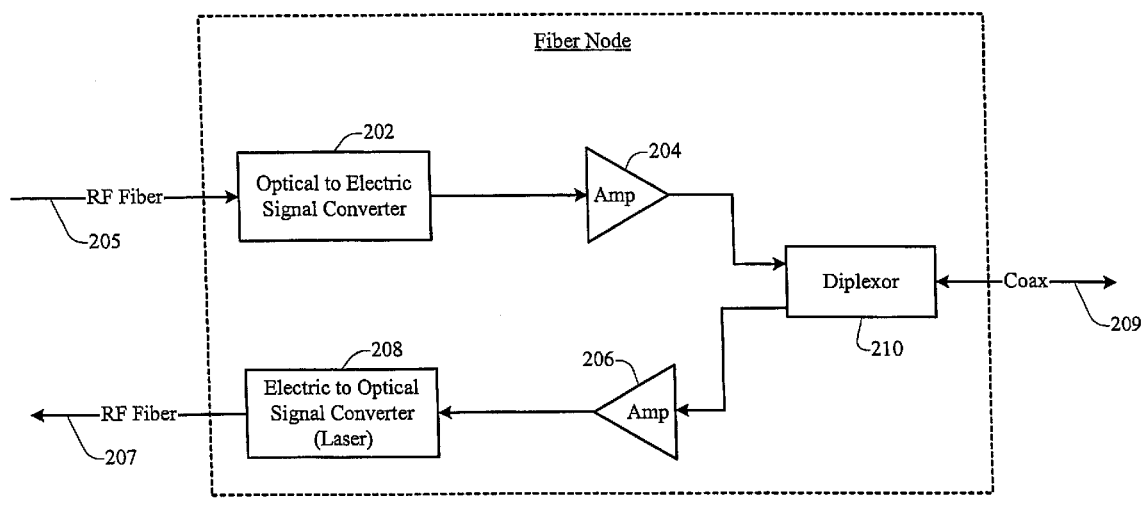
FIG. 2 is a diagrammatic representation of a fibre node.

FIG. 2 is a diagrammatic representation of one example of a conventional fibre node 106a of FIG. 1. In conventional cable networks, the fibre node 200 is responsible for converting RF modulated wavelength optical signals into electrical signals and vice versa. The RF modulated optical signals enter the fibre node 200 via downstream RF fibre 205, and are converted into electric signals by the optical-to-electric signal converter 202. The electrical signals are then amplified by downstream amplifier 204. The amplified electric signals are then passed to a diplexor 210 that transmits the electric signals over the coaxial line 209 to the plurality of cable modems.

In the reverse direction, the cable modems transmit electrical signals via the coaxial line 209 to the fibre node 200. The upstream electrical signals from the cable modems are received at the diplexor 210, and passed to the upstream amplifier 206. The upstream electrical signals are then passed from the amplifier 206 to an electric-to-optical signal converter 208, which converts the upstream electric signals into radio frequency wavelength modulated optical signals which are then transmitted to the cable network head end via upstream RF fibre 207.

The cable modem tuner is configured to communicate with the cable network head end 102 through a fibre node at particular downstream frequencies and transmission power levels. The frequencies and power levels used by a cable modem to communicate through a cable network such as a Hybrid Fibre Coaxial (HFC) network are referred to herein as downstream frequencies and transmission power levels, respectively. Typical downstream frequencies lie between 93 MHz and 855 MHz and typical transmission power levels lie between −20 dB and +20 dB although other downstream frequencies and transmission power levels are contemplated. To allow reliable service for applications such as video, voice, and data, a cable modem tuner maintains particular transmission power levels while communicating through the cable network at a particular downstream frequency.

However, many elements in a Hybrid Fibre Coaxial (HFC) network can affect power levels and reliable service. Some factors are non-calibrated downstream or upstream amplifiers, deterioration of network lines or network nodes, and impedance mismatches created by added stubs. It would be beneficial to provide transmission power levels to an MSO in order to allow more reliable service as well as more effective diagnosis and maintenance of problems with the HFC network in general and with individual subscribers in particular.

In typical cable modems, however, the tuner does not have a transmission power level detector. Typical cable modems, however, do have internal gain levels that are indicative of transmission power levels. Internal gain levels will be described in more detail below. Cable modems also generally have a downstream frequency indicator.

Figure 3:
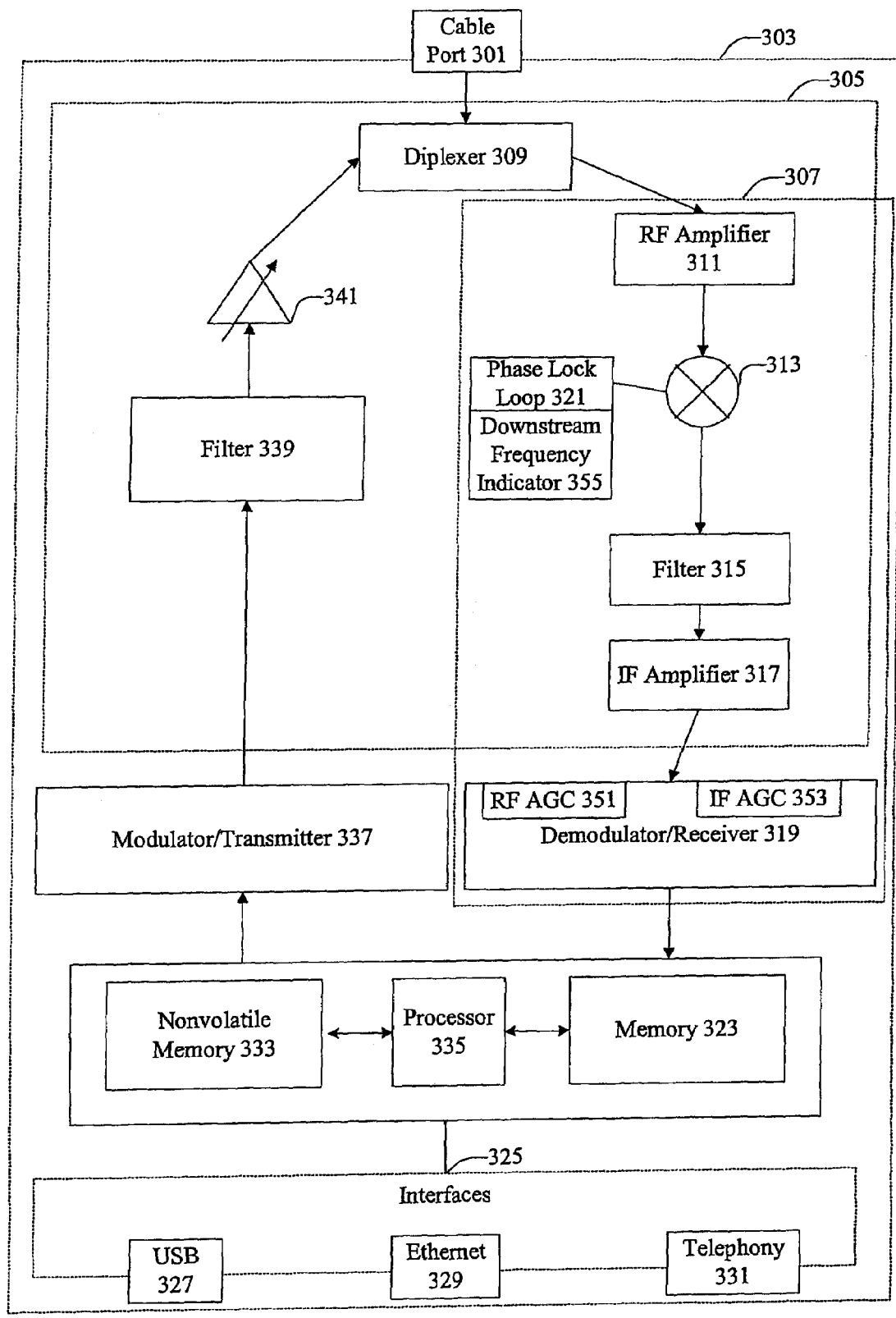
FIG. 3 is a diagrammatic representation of a cable modem.

FIG. 3 is a diagrammatic representation of a cable modem having an internal gain level indicator. According to specific embodiments, a cable modem 303 has a cable port 301 to connect the cable modem with a head end. It also has a tuner 305, modulator 337, demodulator 319, processor 335, memory 323, and USB 327, Ethernet 329, or telephony 331 ports to connect the cable modem to client hardware. It should be noted that multiple components of a cable modem may be contained in a single integrated circuit, or may be a combination of digital and analog circuitry. According to various embodiments, the tuner 305 is a separate component associated with a nonvolatile memory 333.

Tuner 305 typically includes an upstream circuit for transmitting data to a head end and a downstream circuit for receiving data from the head end. The tuner can accommodate both functions through a diplexer connected to a single cable port. Downstream data sent to the cable modem from a head end is amplified using an RF amplifier 311. RF amplifier 311 is connected to a mixer 313 coupled with a phase lock loop 321. The phase lock loop 321 coupled with the mixer 313 selects a channel and converts the RF signal into an IF signal. According to various embodiments, the tuner also contains a downstream frequency indicator 355 coupled to the phase lock loop 321. The IF signal is passed through a filter 315 and amplified by an IF amplifier 317. The IF signal is introduced into a demodulator/receiver 319. The demodulator/receiver 319 contains components for analog to digital conversion, demodulation, frame synchronization, and error correction.

In typical implementations, the demodulator 319 receives signals from the tuner 305 at a set power level. To maintain the set power level, the demodulator 319 provides feedback signals to the tuner 305 to adjust the amount of amplification applied during the conversion of the RF signal to an IF signal. According to various embodiments, the feedback signals are IF AGC and RF AGC values contained in registers 351 and 353. In typical implementations, when the transmission power levels are higher, the internal gain levels such as the IF AGC and RF AGC values are lower. That is, when the transmission power levels are higher, less amplification of the signal is applied at the tuner 305 before providing a frequency converted signal to the demodulator 319. Values for adjusting the power level of the signal provided to the demodulator are referred to herein as the internal gain levels. In one embodiment, the internal gain level is the sum of IF AGC and RF AGC.

The downstream data transmission is then passed to a processor 335 connected to memory 323. A processor 335 may be a general purpose CPU or a specially configured ASIC. According to specific embodiments, the processors encapsulate and decapsulate packets within a MAC header, preferably according to the DOCSIS standard for transmission of data or other information. The encapsulation and decapsulation can be performed by processor 335 coupled with memory 323 or by special purpose MAC hardware. The transmission is then passed to local interface 325 comprising ports supporting protocols and standards such as USB, Ethernet, PCI, and telephony.

A client wishing to send data upstream through the cable modem does so through interface 325. The packets are processed and encapsulated by processor 335 coupled with memory 323 and passed to the upstream modulator/transmitter 337. The processor 335 can also time the transmissions of the upstream bursts. The modulator/transmitter encodes the data, modulates the data onto a selected frequency, and converts the signal from digital to analog. The signal is filtered at 339 and passed on to a variable reverse amplifier 341 before transmitting the signal through diplexer 309 onto the cable network.

The transmitter circuitry of the cable modem typically has variable reverse amplifier 341, filter 339, and the modulator/transmitter 337. Cable modems can also have enable and disable functionality for transmitter circuitry. The transmit enable and disable states allow the cable modem to put the transmitter circuitry in standby mode, so that the cable modem consumes less power when no data needs to be transmitted to the head end.

Receiver circuitry 307 of the cable modem contains RF amplifier 311, phase lock loop 321, mixer 313, filter 315, and IF amplifier 317. Receiver circuitry 307 can additionally comprise processors, memory, and MAC hardware.

Figure 4:
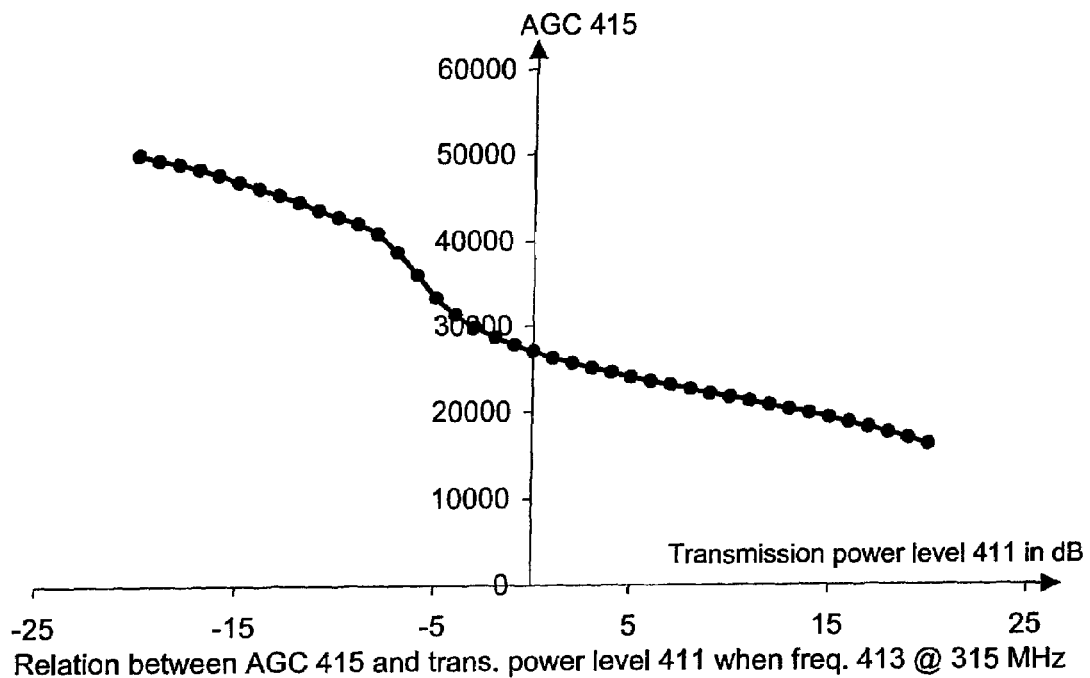
FIG. 4 is a graphical representation showing the relationships between internal gain levels, frequency, and transmission power levels.
Figure 4:
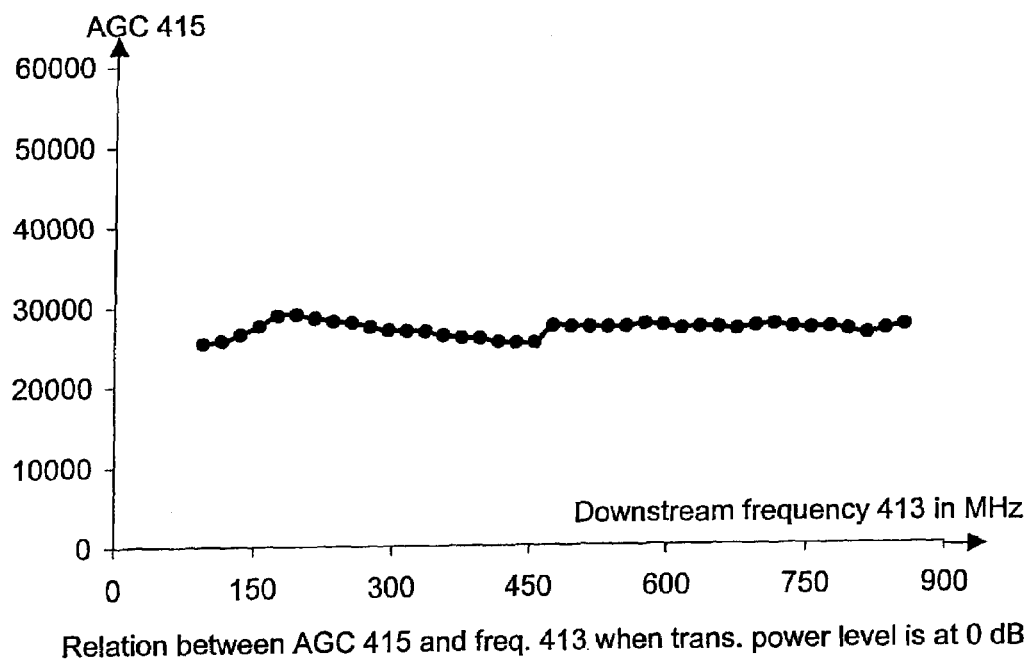

FIG. 4 is a graphical representation showing the relationship between transmission power levels 411, downstream frequency 413, and internal gain levels 415. As noted above, internal gain levels can be used for adjusting the amplification of signals provided to the demodulator from the tuner. Typically, internal gain levels decrease as transmission power levels increase. In one example, the amplification of the internal signal level from tuner to the demodulator does not need to be as high when the transmission power level at the tuner is already high.

Internal gain levels and transmission power levels can also vary as a function of frequency. It should be noted that many tuners include different amplifiers for different frequency bands. In one embodiment, an amplifier stage is provided for each of the different UHF, VHF low, and VHF high bands. Within a single band, increases in frequency typically correspond to lower internal gain levels or higher transmission power levels. The relationships between internal gain levels, downstream frequencies, and transmission power levels are typically similar in cable modems in a family of cable modems. However, some differences remain even between cable modems in a cable modem family. In one example, the relationship between downstream frequency, transmission power levels, and internal gain levels in cable modems within a single cable modem family differ by an internal gain level offset. Any value for determining power characteristics of the cable modem in relation to the cable modem family is referred to herein as an internal gain level offset. By recognizing the characteristics of the family of cable modems, many characteristics of the particular cable modem in the cable modem family can be recognized.

In particular, having two of the three variables known in the power characteristics table can allow a determination of the third variable. According to various embodiments, if the internal gain levels can be ascertained by reading IF AGC and RF AGC values, for example, and the downstream frequency can be ascertained by reading a downstream frequency indicator, transmission power levels can be determined. Transmission power levels can then be stored and provided to a multiple service operator in order to ensure reliable data transmission.

Figure 5:
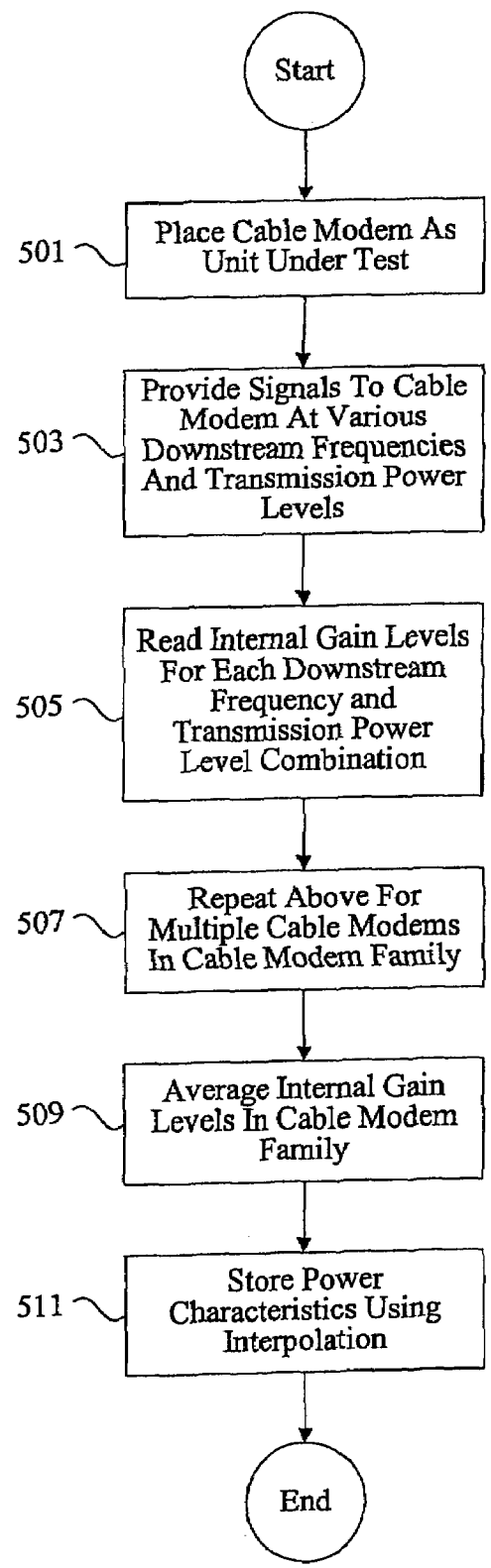
FIG. 5 is a process flow diagram showing techniques for determining the power characteristics of a cable modem family.

FIG. 5 is a process flow diagram showing techniques for determining the power characteristics of a cable modem family. At 501, a cable modem in a cable modem family is treated as a unit under test. According to various embodiments, the cable modem at 503 is fed signals at frequencies between 93 MHz and 855 MHz in 6 Mhz steps along power levels between −20 dB and +20 dB in 1 dB steps. It should be noted that the techniques of the present invention contemplate a variety of frequency bands, power bands, frequency increments, and power increments. The internal gain levels can then be read at each downstream frequency and transmission power level combination at 505 to yield a data structure having 41 transmission power level entries by 128 downstream frequency entries. In one embodiment, this 5248 entry table has 41 rows representing transmission power levels from −20 dB to +20 db and 128 columns representing downstream frequencies from 93 MHz to 855 MHz. This process can be repeated for a number of different tuners and the family of cable modems to acquire internal gain levels for multiple cable modems at 507. At 509, the internal gain levels for each downstream frequency and transmission power level combination can be averaged. In one embodiment, errant values are discarded. At this point, the values can be stored in a cable modem in and the cable modem family as a fairly accurate characterization of the cable modem and the tuner. However, the number of values at this point is large. It would take a large amount of memory in the cable modem to store a 5248 entry data structure.

One solution to reduce the amount of memory needed in the cable modem to store power characteristics of the cable modem family is to use interpolation. The techniques of the present invention allow the efficient storage of power characteristics information for a cable modem family by using interpolation at 511. In one example, linear interpolation can be used to determine where internal gain level variations along downstream frequency and transmission power levels are linear. By recognizing what internal gain levels can be interpolated from surrounding internal gain levels, the table size can be reduced significantly. According to various embodiments, it is recognized that variations in internal gain levels are linear across frequency bands using the same amplifier stage. In one example, variations in internal gain levels are roughly linear across the UHF band, the VHF low band, and the VHF high band. By maintaining internal gain levels at the end points of these various frequency bands, internal gain levels between the end points of these various frequency bands can be interpolated using linear interpolation.

FIG. 6 is a table representation simplified to show linear interpolation that may be applicable to determining the relationships between downstream frequency, transmission power levels, and internal gain levels. In this simplified example, the internal gain level values ranging from 20 k to 90 k vary linearly across downstream frequencies varying from 100 MHz to 200 Mhz and linearly across transmission power levels ranging from 10 dB to 0 dB. Even if the values in column 603 or not stored in a power characteristics table, the values in column 603 could be linearly interpolated by using the values in column 601 and the values in column 605. Similarly, even if the values in row 613 were deleted, the values in row 613 could be linearly interpolated by using the values in row 611 and the values in row 615.

By using linear interpolation, fewer values for internal gain levels, transmission power levels, and downstream frequencies can be stored while maintaining an accurate characterization of the cable modem family. Internal gain levels, transmission power levels, and downstream frequency levels characterizing the cable modem family that are maintained in a cable modem are referred to herein as stored internal gain levels, stored transmission power levels, and stored downstream frequencies. Any data structure for maintaining the stored internal gain levels, stored transmission power levels, and stored downstream frequencies is referred to as a power characteristics table. According to various embodiments, the power characteristics table contains five downstream frequency columns roughly corresponding to the borders of the UHF, VHF low, and VHF high bands and 41 rows representing transmission power levels from −20 dB to +20 dB in 1 dB increments.

It should be noted that although the downstream frequency columns maintained can be those that roughly correspond to the borders of the different frequency bands, the downstream frequencies columns maintained can be determined automatically or manually by inspecting the internal gain level values for linear characteristics. It should also be noted that other types of interpolation can be used as well. In one example, logarithmic or higher order interpolation can be used. Relationships can be represented using two or more variables.

As noted above the characteristics of the cable modem family can be determined quickly and stored efficiently in each cable modem by using interpolation. Each cable modem no longer needs to be tested with a wide range of downstream frequency and transmission power levels to determine internal gain levels. Instead, internal gain levels for the range of downstream frequencies and transmission power levels are determined once for a cable modem family and stored in an efficient manner in each cable modem using interpolation. However, each cable modem within a cable modem family may have slightly different characteristics than other cable modems within the cable modem family. The techniques of the present invention recognize that individual cable modems in a cable modem family typically vary by an offset. In one example, a particular cable modem in a cable modem family may have internal gain levels that are 10 units higher than another cable modem in the cable modem family for the various downstream frequencies and transmission power levels. In order to allow effective characterization of each cable modem by using the power characteristics of the cable modem family, an offset is determined.

Figure 7:
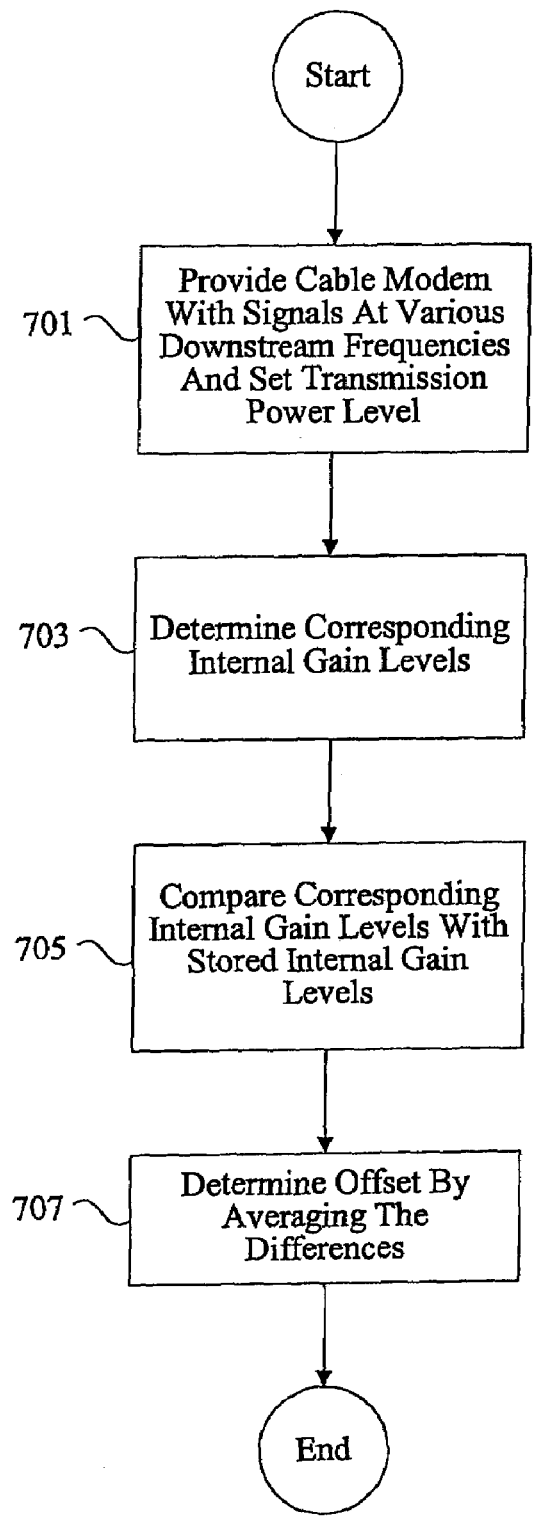
FIG. 7 is a flow process diagram showing the calibration of a cable modem.

FIG. 7 is a flow process diagram showing the calibration of a cable modem by using an offset to adjust for variance within a cable modem family. According to various embodiments, the cable modem can be treated as a unit under tested and provided signals across a wide range of downstream frequencies and transmission power levels to determine internal gain levels. The internal gain levels can then be compared against the stored internal gain levels associated with a cable modem family to determine an offset. However, this technique can be time-consuming and reduces the benefits of using power characteristics of the cable modem family to characterize the cable modem. Instead, if you selected downstream frequencies can be provided to the cable modem at a set transmission power level to determine internal gain levels at that particular transmission power level. The internal gain levels at that particular transmission power level can then be compared to be stored internal gain levels associated with the cable modem family to determine an offset. The offset can then be applied to all internal gain levels across the range of downstream frequencies and transmission power levels.

At 701, the cable modem is provided 5 downstream frequencies all at a 0 dB transmission power level. According to various embodiments, the five internal gain levels corresponding to the five downstream frequencies at the 0 dB transmission power level are determined at 703. The five internal gain levels at 705 are compared against the stored internal gain levels in the power characteristics table associated with the cable modem family. An offset is determined in one example by averaging the differences at 707. It should be noted that interpolation can be used at this point to determine stored internal gain levels for frequencies that are not represented in the power characteristics table. Similarly, interpolation could be used at this point to determine stored internal gain levels for transmission power levels that are not represented in the power characteristics table. The offset is stored in the cable modem. The offset can be applied to all of the values in the power characteristics table or can be dynamically applied to any value read from the cable modem. In one example, the offset can be applied to AGC values read from the demodulator.

It should be noted that the offset can be represented in a variety of different manners. Although an internal gain level offset could be conveniently applied, offsets can also be applied to downstream frequencies and transmission power levels to reach the same effect or to further fine-tune the characterization of the cable modem using the power characteristics table.

After an offset is determined, the particular cable modem can be effectively characterized without putting the cable modem through an extensive unit under test analysis across a wide range of frequencies and a wide range of transmission power levels. As noted above, in typical implementations each individual cable modem is painstakingly placed as a unit under test to determine power characteristics by using an exhaustive range of downstream frequencies, transmission power levels, and internal gain levels. According to the techniques of the present invention, power characteristics for a cable modem family are determined and stored in the cable modem. Each cable modem then can be tested for a limited set of downstream frequencies, transmission power levels, and internal gain levels to determine power characteristics. In typical implementations hundreds to thousands of combinations of downstream frequencies, transmission power levels, and internal gain levels would have to be tested.

According to various embodiments of the present invention, fewer than ten combinations could be tested to determine power characteristics of the cable modem by characterizing the cable modem family before hand. Each individual cable modem can then be characterized against the cable modem family by testing fewer than six combinations, although more can be tested while still falling within the scope of the present invention. The selected downstream frequency and transmission level combinations can be used to determine the offset of the particular cable modem from the cable modem family in an efficient in effective manner that meets the requirements of DOCSIS 1.1, available from Cable Television Laboratories, Louiseville, Colo.

Figure 8:
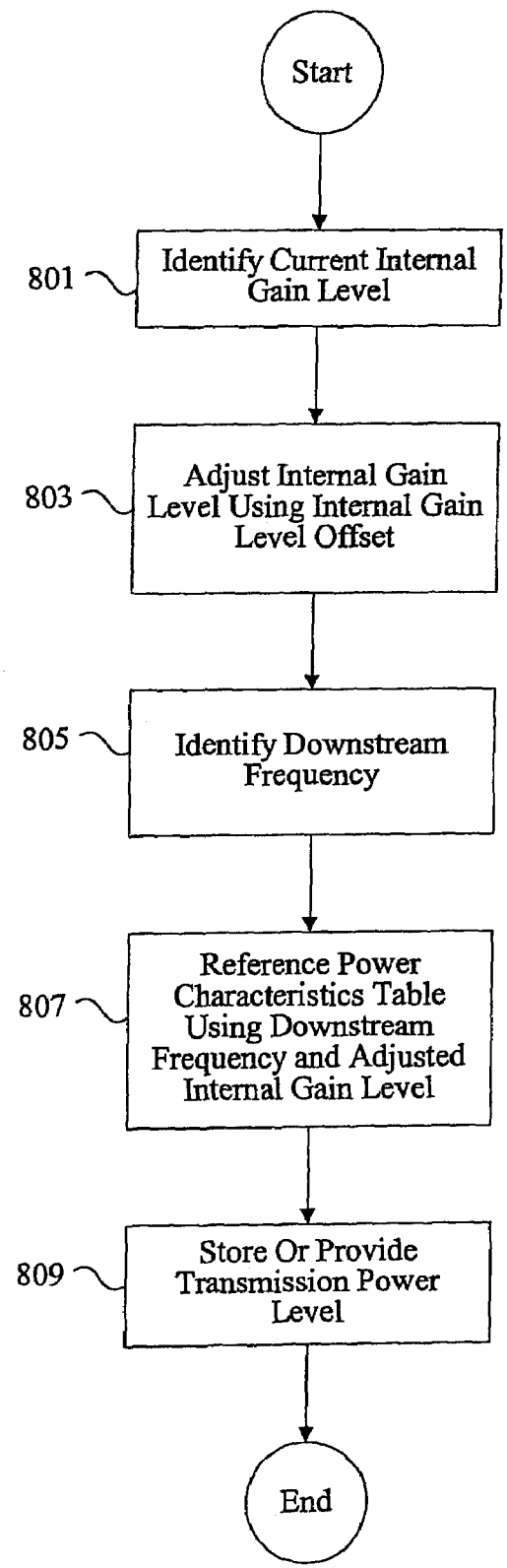
FIG. 8 is a flow process diagram showing techniques for determining transmission power levels.

FIG. 8 is a flow process diagram showing techniques for determining transmission power levels after a cable modem has been calibrated according to the techniques of the present invention. At 801, the measured internal gain level is identified. According to various embodiments, identifying the internal gain level may entail reading and adding the IF AGC and RF AGC values in registers associated with the demodulator. At 803, the internal gain offset can be added to the measured internal gain level to determine the adjusted internal gain level. At 805, the downstream frequency can be determined by reading the downstream frequency indicator associated with the tuner. At 807, the power characteristics table can be referenced using the downstream frequency and the adjusted internal gain level to determine the transmission power level. It should be noted that interpolation such as linear interpolation can be used to determine transmission power levels for downstream frequencies and internal gain levels that are not explicitly stored in the power characteristics table. At 809, the transmission power level can be stored and/or provided to the cable network head end to allow more efficient and effective operation of the cable network.

In the context of a cable network, the invention can be implemented in a cable modem coupled with a cable modem termination system, such as Cisco 6920 RateMux® available from Cisco Systems, Inc, or in a line card of a cable modem head end such as the Cisco UBR 7200 also available from Cisco Systems, Inc.

Figure 9:
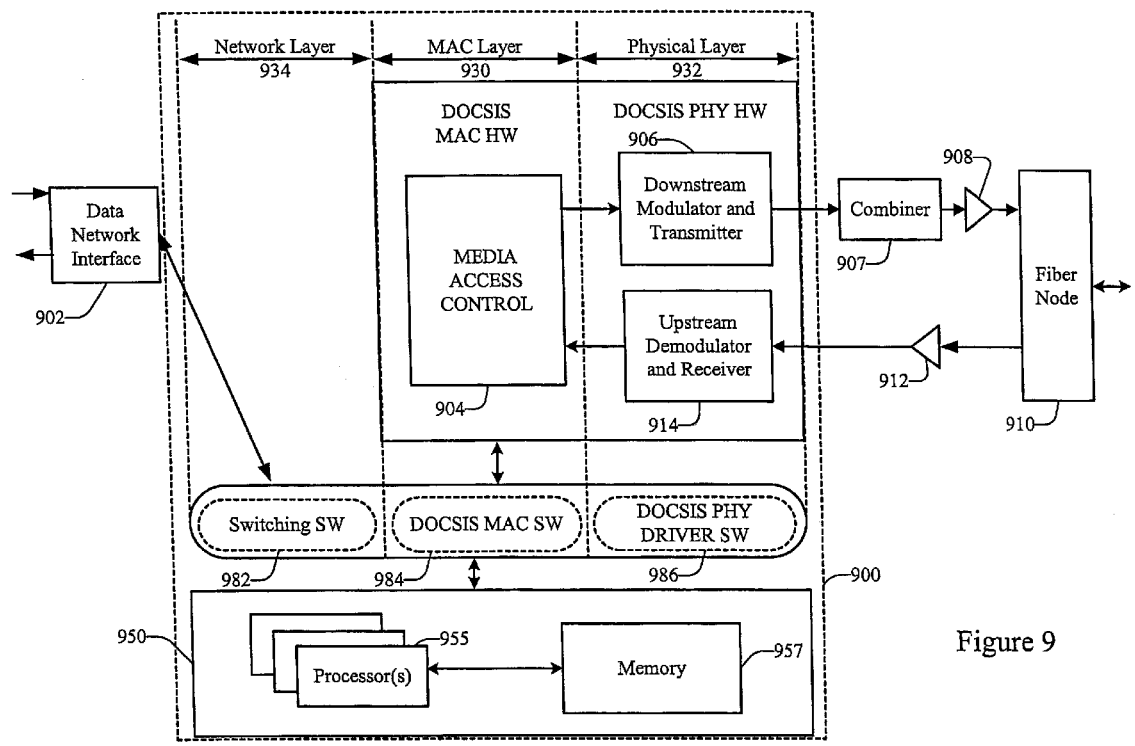
FIG. 9 is a diagrammatic representation of a cable modem termination system that can be used with the techniques of the present invention.

FIG. 9 depicts the basic components of a cable modem head end that can be coupled with a cable modem. A Data Network Interface 902 is an interface component between an external data source and the cable system. External data sources transmit data to data network interface 902 via optical fibre, microwave link, satellite link, or through various other media. Also as mentioned above, a Media Access Control Block (MAC Block) 904 receives data packets from a Data Network Interface 902 and encapsulates them with a MAC header.

In a specific embodiment as shown in FIG. 9, CMTS 900 provides functions on three network layers including a physical layer 932, a Media Access Control (MAC) layer 930, and a network layer 934. Generally, the physical layer is responsible for receiving and transmitting RF signals on the cable plant. Hardware portions of the physical layer include a downstream modulator and transmitter 906 and an upstream demodulator and receiver 914. The physical layer also includes software 986 for driving the hardware components of the physical layer.

Once an information packet is demodulated by the demodulator/receiver 914, it is then passed to MAC layer 930. A primary purpose of MAC layer 930 is to encapsulate and decapsulate packets within a MAC header, preferably according to the above-mentioned DOCSIS standard for transmission of data or other information.

MAC layer 930 includes a MAC hardware portion 904 and a MAC software portion 984, which function together to encapsulate information packets with the appropriate MAC address of the cable modem(s) on the system. After the upstream information has been processed by MAC layer 930, it is then passed to network layer 934. Network layer 934 includes switching software 982 for causing the upstream information packet to be switched to an appropriate data network interface on data network interface 902.

When a packet is received at the data network interface 902 from an external source, the switching software within network layer 934 passes the packet to MAC layer 930. MAC block 904 transmits information via a one-way communication medium to downstream modulator and transmitter 906. Downstream modulator and transmitter 906 takes the data (or other information) in a packet structure and converts it to modulated downstream frames, such as MPEG or ATM frames, on the downstream carrier using, for example, QAM 64 modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK. Data from other services (e.g. television) is added at a combiner 907. Converter 908 converts the modulated RF electrical signals to optical signals that can be received and transmitted by a Fibre Node 910 to the cable modem hub.

It is to be noted that alternate embodiments of the CMTS (not shown) may not include network layer 934. In such embodiments, a CMTS device may include only a physical layer and a MAC layer, which are responsible for modifying a packet according to the appropriate standard for transmission of information over a cable modem network. The network layer 934 of these alternate embodiments of CMTS devices may be included, for example, as part of a conventional router for a packet-switched network.

In a specific embodiment, the network layer of the CMTS is configured as a cable line card coupled to a standard router that includes the physical layer 932 and MAC layer 930. Using this type of configuration, the CMTS is able to send and/or receive IP packets to and from the data network interface 902 using switching software block 982. The data network interface 902 is an interface component between external data sources and the cable system. The external data sources transmit data to the data network interface 902 via, for example, optical fibre, microwave link, satellite link, or through various media. The data network interface includes hardware and software for interfacing to various networks such as, for example, Ethernet, ATM, frame relay, etc.

As shown in FIG. 9, the CMTS includes a hardware block 950 including one or more processors 955 and memory 957. These hardware components interact with software and other hardware portions of the various layers within the CMTS. Memory 957 may include, for example, I/O memory (e.g. buffers), program memory, shared memory, etc. Hardware block 950 may physically reside with the other CMTS components.

Because such information and program instructions may be employed to implement the systems/methods described herein, the present invention relates to machine readable media that include program instructions, state information, etc. for performing various operations described herein. Machine readable media may contain instructions for programming tuner characteristics onto a nonvolatile memory. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Aspects of the invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. For example, the head end has a variety of embodiments, which include a cable modem termination system coupled to a router or a multicast router. A cable modem can also be a separate entity or entirely integrated into a client system. Therefore, the scope of the invention should be determined with reference to the appended claims.

What is claimed is:

1. A method comprising:
    determining average internal gain levels for a family of cable modems across a plurality of downstream frequencies and a plurality of transmission power levels;
    storing a subset of the average internal gain levels for the family of cable modems in a cable modem memory;
    interpolating internal gain levels for a cable modem in the family of cable modems using the subset of the average internal gain levels.

2. The method of claim 1, wherein average internal gain levels are used for adjusting internal power levels between a tuner and a demodulator associated with the cable modem.

3. The method of claim 2, wherein the transmission power levels are power levels between the tuner and an external node.

4. The method of claim 3, wherein the average internal gain levels are a combination of IFAGC and RFAGC values.

5. The method of claim 3, wherein the subset of the average internal gain levels comprise internal gain levels across a second subset of the plurality of frequencies.

6. The method of claim 5, wherein the second subset is five frequencies between 93 MHz and 855 MHz.

7. The method of claim 5, wherein the average internal gain levels between the subset of the plurality of frequencies can be determined substantially by using linear interpolation.

8. The method of claim 5, wherein the first subset of the first and second internal gain levels comprises first and second internal gain levels across a third subset of the plurality of power levels.

9. The method of claim 1, wherein the average internal gain levels are stored in volatile memory associated with the cable modem.

10. A system, comprising:
    a processor operable to determine average internal gain levels for a family of cable modems across a plurality of downstream frequencies and a plurality of transmission power levels;
    memory operable to store a subset of the average internal gain levels for the family of cable modems in a cable modem memory;
    wherein internal gain levels for a cable modem in the family of cable modems are interpolated using the subset of the average internal gain levels.

11. The method of claim 10, wherein internal gain levels are used for adjusting internal power levels between a tuner and a demodulator associated with the cable modem.

12. The method of claim 11, wherein the transmission power levels are power levels between the tuner and an external node.

13. The method of claim 12, wherein the average internal gain levels are a combination of IFAGC and RFAGC values.

14. The method of claim 12, wherein the subset of the average internal gain levels comprise internal gain levels across a second subset of the plurality of frequencies.

15. The method of claim 14, wherein the second subset is five frequencies between 93 MHz and 855 MHz.

16. The method of claim 14, wherein the average internal gain levels between the subset of the plurality of frequencies can be determined substantially by using linear interpolation.

17. The method of claim 14, wherein the first subset of the first and second internal gain levels comprises first and second internal gain levels across a third subset of the plurality of power levels.

18. The method of claim 10, wherein the average internal gain levels are stored in volatile memory associated with the cable modem.

19. An apparatus, comprising:
    means for determining average internal gain levels for a family of cable modems across a plurality of downstream frequencies and a plurality of transmission power levels;
    means for storing a subset of the average internal gain levels for the family of cable modems in a cable modem memory;
    means for interpolating internal gain levels for a cable modem in the family of cable modems using the subset of the average internal gain levels.

20. The method of claim 1, wherein internal gain levels are used for adjusting internal power levels between a tuner and a demodulator associated with the cable modem.

* * * * *